United States Patent
Yamazaki

(10) Patent No.: US 8,068,085 B2
(45) Date of Patent: Nov. 29, 2011

(54) ELECTRO-OPTICAL DEVICE, METHOD OF DRIVING ELECTRO-OPTICAL DEVICE, AND ELECTRONIC APPARATUS

(75) Inventor: Katsunori Yamazaki, Matsumoto (JP)

(73) Assignee: Sony Corporation, Tokyo (JP)

( * ) Notice: Subject to any disclaimer, the term of this patent is extended or adjusted under 35 U.S.C. 154(b) by 837 days.

(21) Appl. No.: 11/348,240

(22) Filed: Feb. 7, 2006

(65) Prior Publication Data

US 2006/0192744 A1 Aug. 31, 2006

(30) Foreign Application Priority Data

Feb. 28, 2005 (JP) ................................. 2005-052683

(51) Int. Cl.
*G09G 3/36* (2006.01)
(52) U.S. Cl. .............. 345/100; 345/89; 345/96; 345/98; 345/204; 345/208
(58) Field of Classification Search .......... 345/98, 345/100, 90, 690, 55, 76, 77, 80, 83, 89, 345/208–210, 204, 96; 315/169.3
See application file for complete search history.

(56) References Cited

U.S. PATENT DOCUMENTS

| | | | | |
|---|---|---|---|---|
| 5,712,652 | A * | 1/1998 | Sato et al. | 345/90 |
| 6,756,740 | B2 * | 6/2004 | Inukai | 315/169.3 |
| 7,365,719 | B2 * | 4/2008 | Miyagawa | 345/82 |
| 2003/0080934 | A1 * | 5/2003 | Ishiyama | 345/100 |
| 2003/0174116 | A1 * | 9/2003 | Maeda et al. | 345/98 |
| 2004/0252249 | A1 * | 12/2004 | Hong | 349/37 |
| 2005/0204219 | A1 * | 9/2005 | Taguchi et al. | 714/724 |
| 2006/0007249 | A1 * | 1/2006 | Reddy et al. | 345/690 |

FOREIGN PATENT DOCUMENTS

JP A 4-110891 4/1992

* cited by examiner

*Primary Examiner* — Lun-Yi Lao
*Assistant Examiner* — Insa Sadio
(74) *Attorney, Agent, or Firm* — K&L Gates LLP

(57) ABSTRACT

An electro-optical device includes pixels that are provided to correspond to intersections of a plurality of rows of scanning lines and a plurality of pairs of first and second data lines; a scanning line driving circuit that selects the plurality of rows of scanning lines according to a predetermined sequence; and a data line driving circuit that supplies a data signal having a voltage according to a gray-scale level of each of pixels corresponding to the selected scanning line to the first data line, and supplies an inverted data signal obtained by inverting the data signal on the basis of a predetermined potential to the second data line. Each of the pixels has a pixel electrode; a common electrode that faces the pixel electrode; a first transistor that is turned on when a corresponding scanning line is selected to supply the data signal from the first data line to the pixel electrode; and a second transistor that is turned on when another scanning line different from the corresponding scanning line is selected prior to the corresponding scanning line, and supplies the inverted data signal from the second data line to the pixel electrode.

10 Claims, 5 Drawing Sheets

ELECTRO-OPTICAL DEVICE, METHOD OF DRIVING ELECTRO-OPTICAL DEVICE, AND ELECTRONIC APPARATUS

BACKGROUND

1. Technical Field

The present invention relates to a technology for preventing occurrence of crosstalk.

2. Related Art

An electro-optical device which performs display through an electro-optical change of liquid crystal or the like has a structure in which a pixel having a pixel capacitor and a first transistor is disposed so as to correspond to an insulating intersection between a scanning line and a data line. Among them, the pixel capacitor has a structure in which an electro-optical material is interposed between a pixel electrode provided for each pixel and a common electrode that is opposite to the pixel electrode and has a predetermined voltage in a time-variant manner. In addition, an optical characteristic of the pixel (transmittance and reflectance) varies in accordance with an effective voltage value written in the pixel capacitor. If the scanning line is selected, the corresponding first transistor enters an electrically conductive state (on state) between the data line and the pixel electrode. For this reason, when the scanning line is selected, a voltage according to a gray-scale level is supplied to the data line, so that gray-scale display can be performed for each pixel.

In recent years, with higher definition of a pixel, a period in which one scanning line is selected has become shorter. For this reason, a technology has been proposed in which an additional second transistor is provided, a voltage having the same polarity as a written voltage is written in advance through the second transistor before writing a voltage according to a gray-scale level through the first transistor, and a time required for writing the voltage is reduced (for example, JP-A-4-110891).

However, since the transistor is not completely turned off in a non-selection state of the scanning line (holding period), the voltage written in the pixel capacitor may leak in the data line through the transistor. An amount of leaking voltage varies in accordance with a potential of the data line for the holding period, and the potential of the data line is determined in accordance with display contents corresponding to one column corresponding to the data line in a vertical direction. For this reason, according to a display pattern, an amount of leaking voltage in the pixel may be different for every column. This means that a deviated amount from a target gray-scale level is different from every column. Therefore, even when display is performed with the same gray-scale level, a gray-scale level may be different from every column, thereby lowering a display quality. In addition, this phenomenon is called vertical crosstalk because it is generated in a vertical direction along the data line.

SUMMARY

An advantage of some aspects of the invention is that it provides an electro-optical device capable of achieving high definition display by eliminating vertical crosstalk, a method of driving an electro-optical device, and an electronic apparatus.

According to an aspect of the invention, an electro-optical device includes: pixels that are provided to correspond to intersections of a plurality of rows of scanning lines and a plurality of pairs of first and second data lines; a scanning line driving circuit that selects the plurality of rows of scanning lines according to a predetermined sequence; and a data line driving circuit that supplies a data signal having a voltage according to a gray-scale level of each of pixels corresponding to the selected scanning line to the first data line, and supplies an inverted data signal obtained by inverting the data signal on the basis of a predetermined potential to the second data line. Further, each of the pixels has a pixel electrode; a common electrode that faces the pixel electrode; a first transistor that is turned on when a corresponding scanning line is selected to supply the data signal from the first data line to the pixel electrode; and a second transistor that is turned on when another scanning line different from the corresponding scanning line is selected before the corresponding scanning line, and supplies the inverted data signal from the second data line to the pixel electrode.

According to this configuration, since the data signal supplied to the first data line and the inverted data signal supplied to the second data line have inverted voltage relationships such that their voltages have different polarities, an amount of leaking voltage of the first transistor and an amount of leaking voltage of the second transistor have complementary relationships for a holding period. Therefore, the amount of leaking voltage becomes uniform for each pixel without depending on the displayed contents.

Preferably, the electro-optical device further includes: a first auxiliary capacitor that capacitively couples the first data line to the pixel electrode; and a second auxiliary capacitor that capacitively couples the second data line to the pixel electrode.

Preferably, the pixel electrode and the common electrode are formed on the same substrate. Further, preferably, the first auxiliary capacitor has a laminated structure of an electrode portion in the first data line, an insulating layer, and the pixel electrode, and the second auxiliary capacitor has a laminated structure of an electrode portion in the second data line, an insulating layer, and the pixel electrode.

Preferably, the data line driving circuit divides the voltage of the data signal into a high-level positive voltage and a low-level negative voltage on the basis of the predetermined potential for each predetermined period so as to alternately supply the high-level positive voltage and the low-level negative voltage, and causes the voltage of the data signal when the first transistor is turned on and the voltage of the inverted data signal when the second transistor is turned on to have the same polarity. In the pixel electrode, the voltage of the data signal having the same polarity as the data signal written when the first transistor is turned on is already written when the second transistor is turned on. Therefore, it is possible to shorten a charging and discharging time required for the writing operation.

Further, the invention can be conceptualized as a method of driving an electro-optical device, and an electronic apparatus having the electro-optical device, in addition to an electro-optical device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
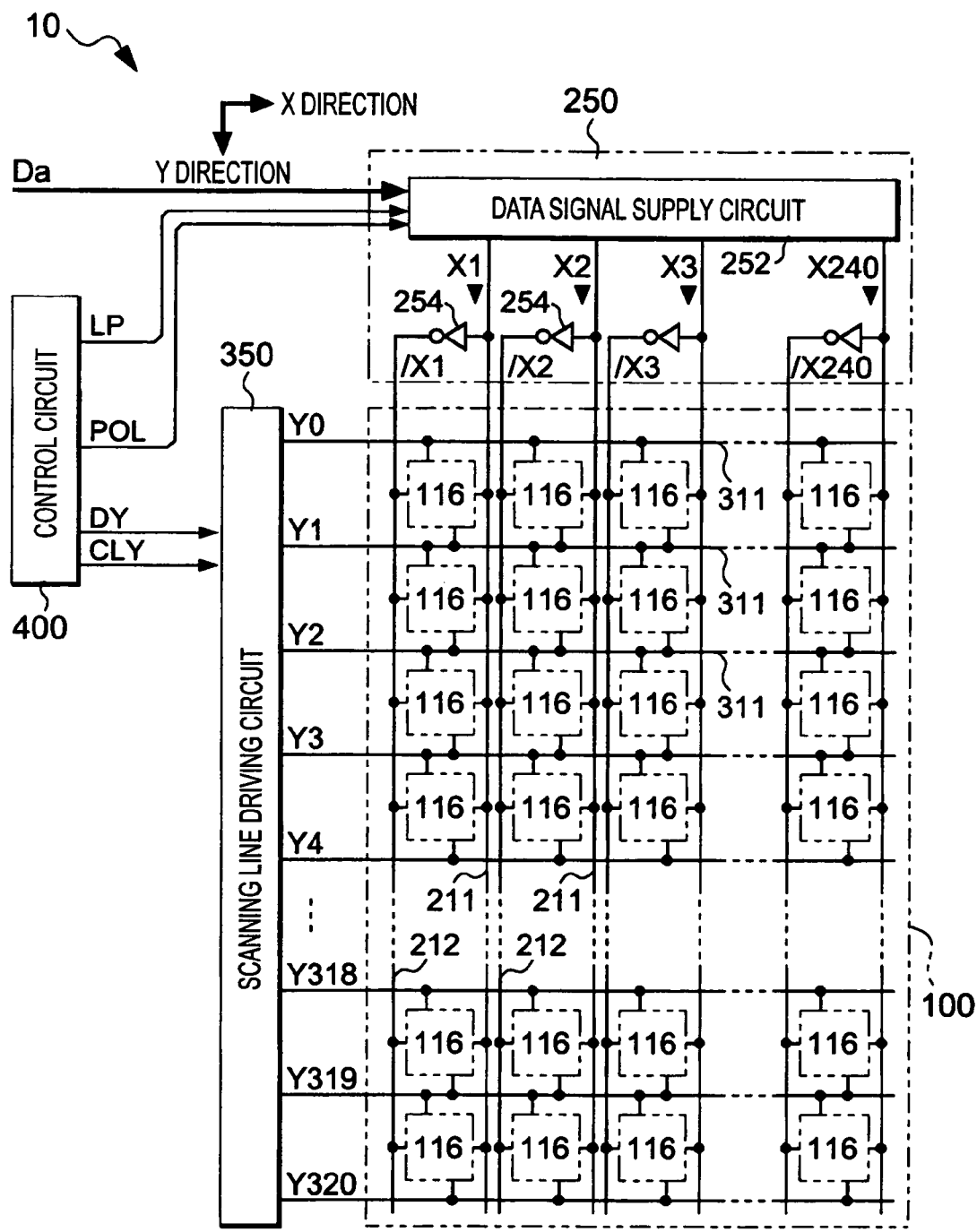
FIG. 1 is a block diagram illustrating a structure of an electro-optical device according to an embodiment of the invention.

Hereinafter, embodiments of the invention will be described with reference to the accompanying drawings. FIG. 1 is a block diagram illustrating a structure of an electro-optical device according to an embodiment of the invention.

As shown in FIG. 1, an electro-optical device 10 includes a liquid crystal panel 100, a data line driving circuit 250, a scanning line driving circuit 350, and a control circuit 400. Among them, in the liquid crystal panel 100, first data lines 211 and second data lines 212 pair up with each other, and the first data lines 211 and the second data lines 212 of 240 columns are provided to extend in a column (Y) direction. Further, scanning lines 311 of 321 rows of 0 to 320 are provided to extend in a row (X) direction.

The pixels 116 are arranged to correspond to intersections of the pairs of the first data lines 211 and the second data lines 212, and the scanning lines 311 of 1st to 320-th rows, excluding the initial zero row. Therefore, in the present embodiment, the pixels 116 are arranged in a matrix of vertical 320 rows× horizontal 240 columns, but it is not intended to limit the invention.

Figure 2A:
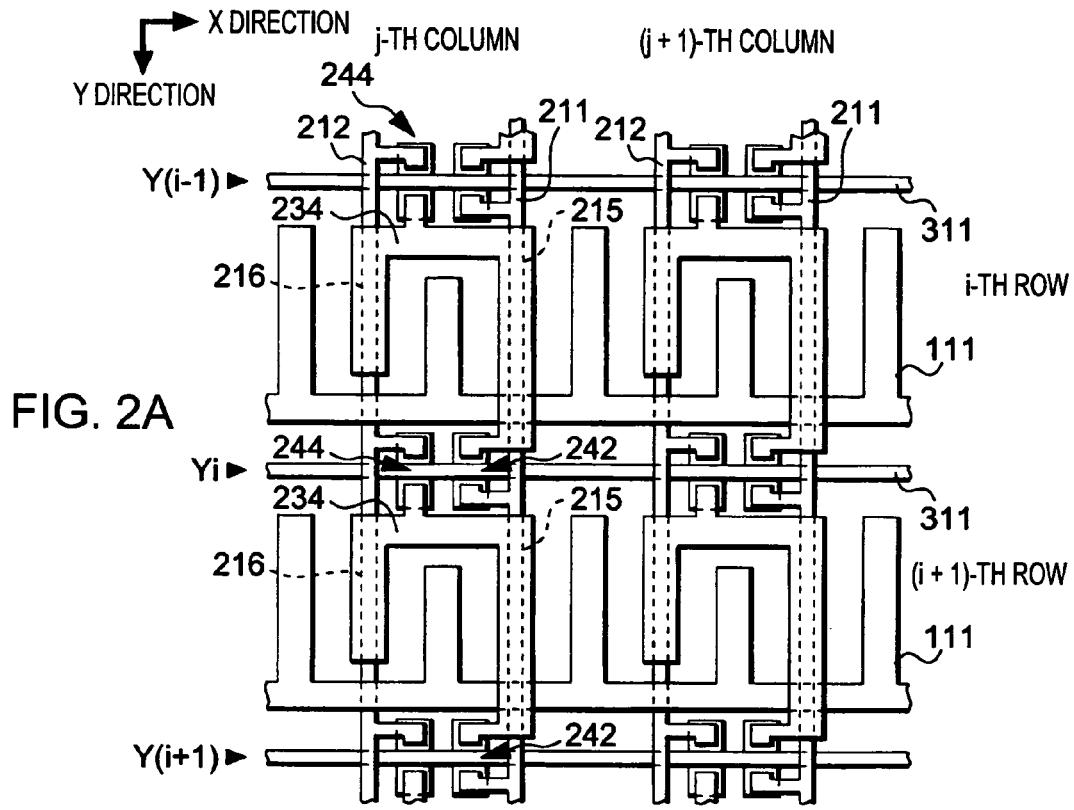
FIG. 2A is a diagram illustrating a structure of a pixel in the same electro-optical device.
Figure 2B:
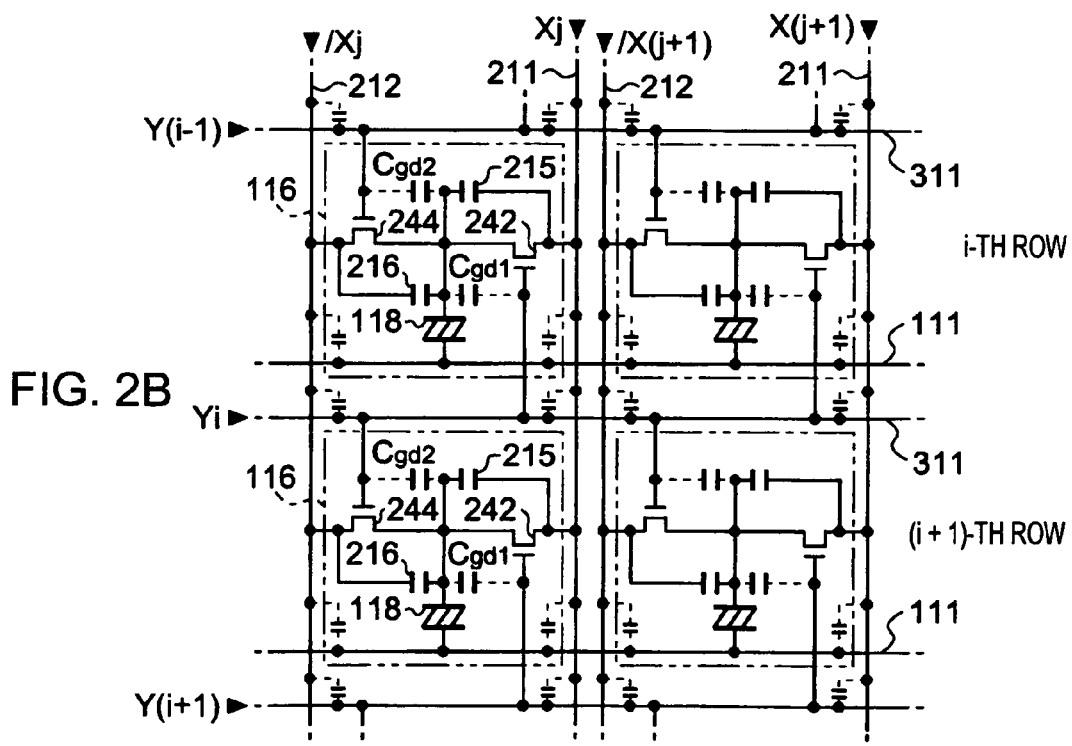
FIG. 2B is a diagram illustrating a structure of a pixel in the same electro-optical device.

Here, the detailed structure of the pixel 116 will be described. FIG. 2A is a plan view illustrating a structure of the pixel 116, and FIG. 2B is an equivalent circuit diagram illustrating a structure of the pixel 116. FIGS. 2A and 2B show the configuration of four pixels of 2×2 corresponding to the intersections of the i-th row and the adjacent (i+1)-th row and the j-th column and the adjacent (j+1)-th column.

Moreover, in FIGS. 2A and 2B, (i−1), i, and (i+1) are symbols generally representing the rows of the scanning lines 311, and are integer numbers of 0 to 320. Further, j and (j+1) are symbols generally representing the columns corresponding to the pixels 116, and are integer numbers of 1 to 240.

As shown in FIG. 2B, each pixel 116 has a pixel capacitor 118, an n-channel first thin film transistor (hereinafter, referred to as TFT) 242, a n-channel second TFT 244, a first auxiliary capacitor 215, and a second auxiliary capacitor 216.

Here, the configuration of the pixel 116 will be described, focusing on the i-th row and the j-th column. In the pixel 116 of the i-th row and the j-th column, a gate of the first TFT 242 is connected to the scanning line 311 of the i-th row, and a source thereof is connected to the first data line 211 of the j-th column. In the meantime, in the same pixel 116 of the i-th row and the j-th column, a gate of the second TFT 244 is connected to the scanning line 311 of the (i−1)-th row before one row, and a source thereof is connected to the second data line 212 of the j-th column. A drain of the first TFT 242 and a drain of the second TFT 244 are commonly connected to one end of the pixel capacitor 118. The other end of the pixel capacitor 118 is connected to a common electrode 111 having a predetermined potential LCcom in a time-variant manner.

Further, the first auxiliary capacitor 215 is electrically inserted between the first data line 211 and one end of the pixel capacitor 118, and the second auxiliary capacitor 216 is electrically inserted between the second data line 212 and one end of the pixel capacitor 118.

The liquid crystal panel 100 has a pair of substrates consisting of an element substrate and a counter substrate, which are bonded to each other with a predetermined gap therebetween. The liquid crystal is filled into the gap. Further, on the element substrate, the pixel electrodes and the common electrode are formed. The element substrate is bonded to the counter substrate such that its electrode formation surface faces the counter substrate. Among them, the electrode formation surface of the element substrate in plan view is shown in FIG. 2A. As apparent from FIG. 2A, the liquid crystal panel 100 uses a so-called in-plane switching (hereinafter, simply referred to as IPS) mode in which a direction of an electric field applied to liquid crystal is in parallel with a surface of one substrate of a pair of substrates.

Specifically, as shown in FIG. 2A, after the first TFTs 242 and the second TFTs 244 are formed on the element substrate, together with the scanning lines 311, the first data lines 211 and the second data lines 212 are formed by patterning a first metal layer through an insulating layer, the first data lines 211, the common electrode 111 is formed by patterning a second metal layer through an insulating layer, and the pixel electrodes 234 are formed by patterning a third metal layer through an insulating layer.

Among them, each pixel electrode 234 is formed in a substantial U shape having one side provided along the first data line 211, one side provided along the second data line 212, and one side provided along the X direction for connecting both sides. Among them, an extended portion of one side provided along the first data line 211 is connected to the drain of the first TFT 242, and one side provided along the X direction is connected to the drain of the second TFT 244.

The common electrode 111 is formed in a comb shape and is disposed to face the pixel electrode 234 with a predetermined distance therebetween. Therefore, in the present embodiment, the pixel capacitor 118 is represented by capacitance generated when the pixel electrode 234 and the common electrode 111 face each other with the liquid crystal interposed therebetween. In the present embodiment, as shown in FIG. 2A, since a part of the common electrode 111 and a part of the pixel electrode 234 intersect each other through an insulator, capacitance is formed at the intersecting portion. For this reason, it can be considered that the capacitance is added to pixel capacitance. Moreover, the pixel electrode 234 corresponds to one end of the pixel capacitor 118, and the common electrode 111 corresponds to the other end of the pixel capacitor 118.

In the pixel capacitor 118, an electric field having intensity according to the held voltage is generated in the horizontal (X) direction of the paper in FIG. 2A or 2B, and thus an alignment state of liquid crystal is changed. Accordingly, the amount of light transmitted through a polarizer (not shown) becomes the value according to the effective voltage value. For this reason, through the voltage of the data signal when the scanning line 311 is selected, the voltage held in the pixel capacitor 118 is controlled for each pixel, so that predetermined gray-scale display can be performed.

Moreover, in the present embodiment, for convenience of explanation, if the effective voltage value approximates to zero, the light transmittance is minimized, and thus black display is performed. Further, as the effective voltage value increases, the amount of transmitted light is increased, and thus white display is performed with the maximum transmittance. This is referred to as a normally black mode.

As described above, the respective metal layers are laminated through the insulator. For this reason, various wiring lines can be maintained in an electrical insulating state. However, since the pixel electrode 234 is laminated along the first data line 211 and the second data line 212, the laminated portion has a laminated structure of the metal/insulator/metal, and the respective capacitors are formed through the laminated structure. Among them, the laminated portion of the first data line 211 and the pixel electrode 234 is used as the first auxiliary capacitor 215, and the laminated portion of the second data line 212 and the pixel electrode 234 is used as the second auxiliary capacitor 216. Further, the first auxiliary capacitor 215 and the second auxiliary capacitor 216 are designed such that their capacitances are substantially equal to each other.

In FIG. 2B, a parasitic capacitance between the gate and the drain of the first TFT 242 is represented as $C_{gd1}$, and a parasitic capacitance between the gate and the drain of the second TFT 244 is represented as $C_{gd2}$. In addition, since the first data line 211 and the second data line 212 intersect each other through the scanning line 311, the common electrode and the insulator, the parasitic capacitances exist due to the intersection, as indicated by a dotted line in FIG. 2B.

Returning to FIG. 1, the control circuit 400 controls scanning of the liquid crystal panel 100 by various control signals of a latch pulse LP for defining a time when one horizontal scanning period starts, a polarity indicating signal POL, a start pulse DY, a clock signal CLY, and the like.

Figure 3:
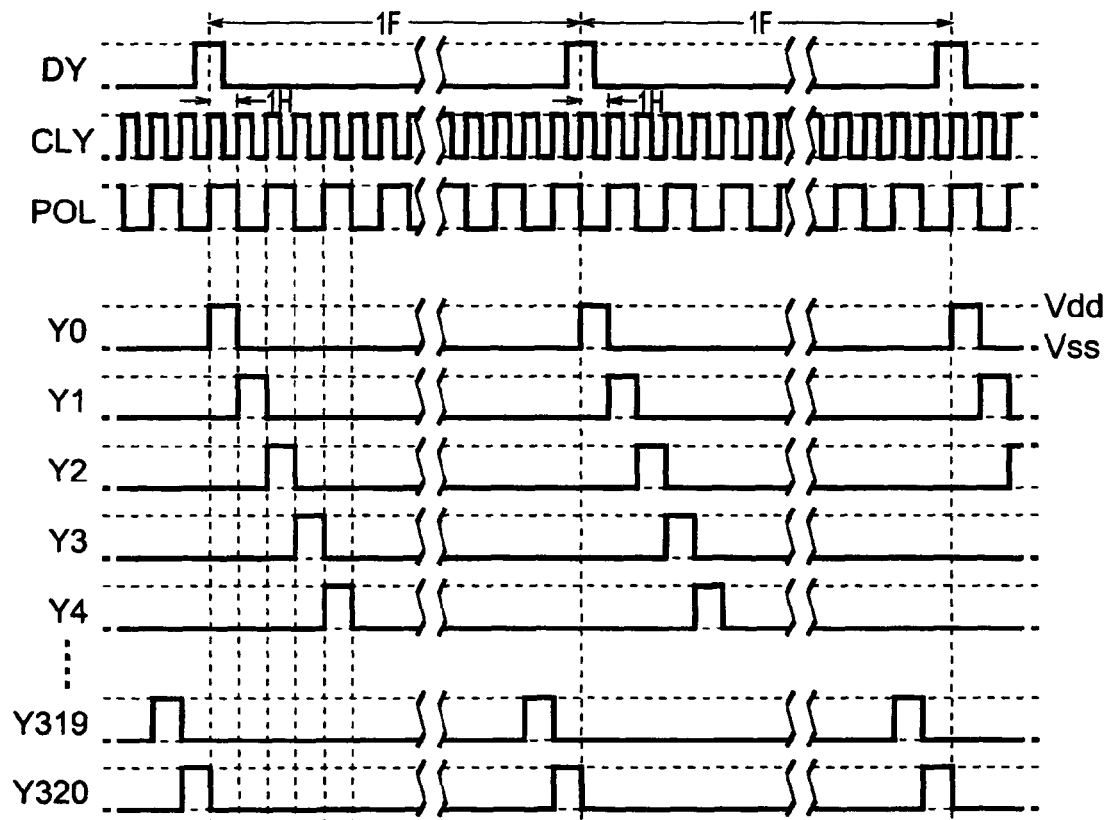
FIG. 3 is a diagram illustrating a scanning signal and a data signal in the same electro-optical device.
Figure 3:
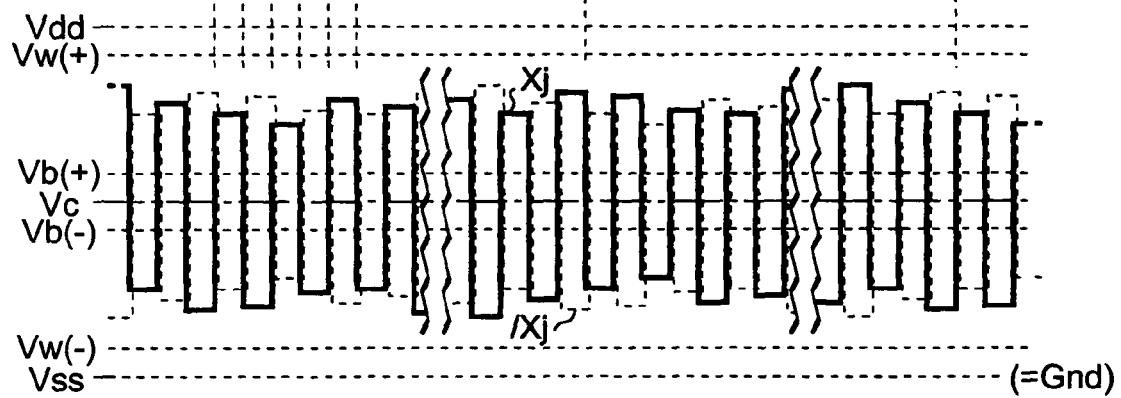

As shown in FIG. 3, the scanning line driving circuit 350 sequentially receives and shifts the start pulse DY to be supplied at the beginning of a vertical scanning period (1F) according to the rising edge of the clock signal CLY, for example, one cycle of which is one horizontal scanning period (1H), and supplies the shift signals to the scanning lines 311 of the zero-th, the first, the second, the third, and 320-th rows as the scanning signals Y0, Y1, Y2, Y3, . . . , and Y320. For this reason, the scanning lines 311 of the zero-th to 320-th rows are selected for each one horizontal scanning period (1H) one-by-one. When the scanning lines 311 are selected, a voltage Vdd corresponding to a high level is applied, and when the scanning lines 311 are not selected, a voltage Vss (=Gnd) corresponding to a low level is applied.

Next, the data line driving circuit 250 will be described. The data line driving circuit 250 has a data signal supply circuit 252 and inversion circuits 254 corresponding to the respective columns. Among them, the data signal supply circuit 252 supplies data signals X1, X2, X3, . . . , and X240 having voltages according to the gray-scale levels of the pixels 116 corresponding to the selected scanning line 311 to the first data lines 211 of the first column, the second column, the third column, . . . , and the 240-th column. The inversion circuits 254 supplies inverted data signal /X1, /X2, /X3, . . . , and /X240, which are obtained by inverting the data signals X1, X2, X3, . . . , and X240 on the basis of a potential Vc, to the second data lines 212 of the first column, the second column, the third column, . . . , and the 240-th column. Moreover, the symbol '/' represents the inversion.

The data signal supply circuit 252 has storage regions (not shown) corresponding to the matrix arrangement of vertical 320 rows×horizontal 240 columns. In each of the storage regions, gray-scale data Da for assigning a gray-scale value (brightness) of the corresponding pixel 116 is stored. Further, when a change in display contents is generated, gray-scale data Da stored in each storage region is rewritten by a high-level device.

The data signal supply circuit 252 reads out gray-scale data Da of the pixel 116 corresponding to the scanning line 311 selected by the scanning line driving circuit 350 from the storage region, converts it into a data signal of a voltage according to the gray-scale value with a polarity assigned by the polarity indicating signal POL, and supplies the data signal to the corresponding first data line 211. The data signal supply circuit 252 executes the supply operation for the first to 240-th columns corresponding to the selected scanning line 311.

Here, the polarity indicating signal POL of the H level assigns a positive polarity writing operation and the polarity indicating signal POL of the L level assigns a negative polarity writing operation. As shown in FIG. 3, the polarity of the polarity indicating signal POL is inverted for every one horizontal scanning period (1H). Further, between adjacent vertical scanning periods (1F), focusing on the horizontal scanning periods in which the same scanning line 311 is selected, the polarity inversion relationship is also established. As such, the reason why the polarity is inverted is to prevent liquid crystal from being degraded due to the application of a direct-current component. Further, in the present embodiment, the reference of a writing polarity is Vc, and a voltage higher than the voltage Vc is referred to as a positive polarity and a voltage lower than the voltage Vc is referred to as a negative polarity.

The data signal to be generated by the data signal supply circuit 252 will be described, focusing on the j-th column. The data signal Xj to be supplied to the first data line 211 of the j-th column is as shown in FIG. 3. That is, if a negative polarity writing operation is instructed in a horizontal scanning period in which the scanning line 311 of the first row is selected, the data signal supply circuit 252 sets the voltage of the data signal Xj so as to be lower than the potential Vc by the voltage according to the gray-scale level of the pixel of the first row and the j-th column. If the negative polarity writing operation is instructed to the scanning line 311 of the first row, the negative polarity writing operation is instructed in a horizontal scanning period in which the scanning line 311 of the second row is selected. Accordingly, for the horizontal scanning period in which the scanning line 311 of the second row is selected, the data signal supply circuit 252 sets the voltage of the data signal Xj so as to be lower than the potential Vc by the voltage according to the gray-scale level of the pixel of the second row and the j-th column. Hereinafter, this operation is repeated.

In the next vertical scanning period (1F), the data signal supply circuit 252 sets the data signal Xj to have the negative polarity in a horizontal scanning period in which the scanning line 311 of an odd-numbered (1, 3, 5, . . . , or 319) row is selected, and sets the data signal Xj to have the positive polarity in a horizontal scanning period in which the scanning line 311 of an even-numbered (0, 2, 4, . . . , or 320) row is selected.

The inverted data signal /Xj has a waveform obtained by inverting the data signal Xj on the basis of the voltage Vc, as indicated by a dotted line in FIG. 3.

Here, the voltage relationship in FIG. 3 will be described. A voltage Vw(−) or a voltage Vb(−) is a negative voltage which is applied to the pixel electrode 234 so as to cause the pixel to perform white display at the maximum gray-scale level or black display at the minimum gray-scale level. In contrast, a voltage Vw(+) or a voltage Vb(+) is a positive voltage which is applied to the pixel electrode 234 so as to cause the pixel to perform white display at the maximum gray-scale level or black display at the minimum gray-scale level. The voltage Vw(+) or the voltage Vb(+) is symmetric to the voltage Vw(−) or the voltage Vb(−) on the basis of the voltage Vc. Further, in the scanning signals Y0, Y1, Y2, Y3, . . . , and Y320, the L level of each of the scanning signals is a potential Vss (lower power supply voltage side) lower than the voltage Vw(−) and the H level of each of the scanning signals is a potential Vdd (higher power supply voltage side) higher than the voltage Vw(+).

Further, in the present embodiment, since the pixel 116 does not exist in the 0-th row, the data signal supply circuit 252 sets each of the data signals X1 to X240 to the voltage corresponding to a predetermined gray-scale value according to the writing polarity in the horizontal scanning period in which the scanning line 311 of the 0-th row is selected. For example, the data signal supply circuit 252 sets each of the data signals X1 to X240 to an intermediate value between white of the maximum gray-scale level and black of the minimum gray-scale level (that is, an intermediate value of the voltage Vw(+) and the voltage Vb(+) at the time of the positive polarity writing operation or an intermediate value of the voltage Vw(−) and the voltage Vb(−) at the time of the negative polarity writing operation) in the horizontal scanning period in which the scanning line 311 of the 0-th row is selected.

Moreover, in FIG. 3, the voltage scales of the scanning signals Y0 to Y320, the data signal Xj (the inverted data signal /Xj), and the like in the vertical direction are different from each other for convenience.

Next, the writing operation in the electro-optical device having such a configuration will be described.

Figure 4:
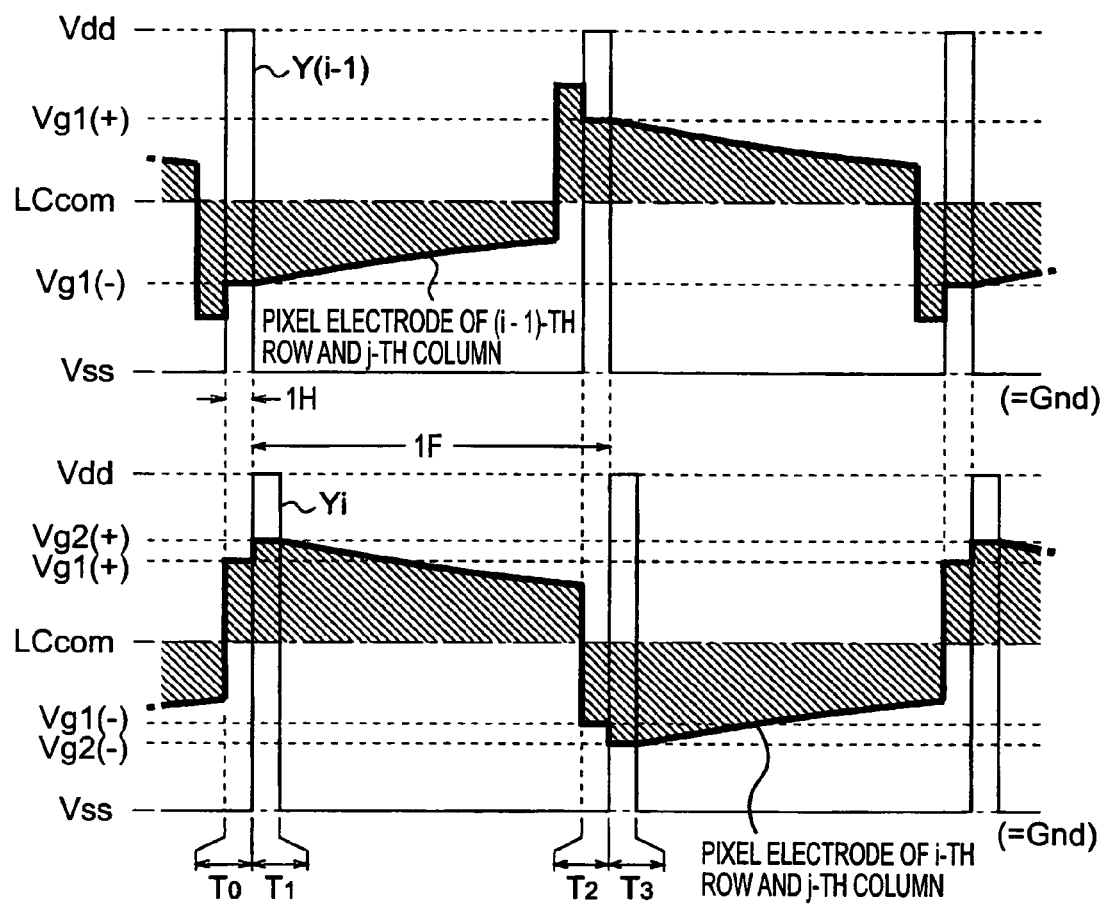
FIG. 4 is a diagram illustrating the writing operation in the same electro-optical device.

FIG. 4 is a diagram showing the relationship of the scanning signals Yi and Y(i−1) between the writing operation of the pixel of the i-th row and the j-th column and the writing operation of the pixel of the (i−1)-th row and the j-th column before one row. In addition, in FIG. 4, the voltage of the pixel electrode 234 of the (i−1)-th row and the j-th column and the voltage of the pixel electrode 234 of the i-th row and the j-th column are shown by thick solid lines, and the scanning signals Y(i−1) and Yi are shown by thin solid lines.

In a case in which the pixel of the (i−1)-th row and the j-th column is displayed with gray slightly brighter than an intermediate gray-scale level between white and black (for convenience of explanation, referred to as gray 1), when the writing operation is performed with the negative polarity, in one horizontal scanning period $T_0$ in which the scanning line 311 of the (i−1)-th row is selected, the data signal Xj becomes a negative voltage Vg1(−) displayed with the gray 1.

Further, for the period $T_0$, since the scanning signal Y(i−1) becomes an H level, in each of the pixels 116 corresponding to the (i−1)-th row, the first TFT 242 is turned on and the second TFT 244 is turned off. For this reason, the pixel electrode 234 of the (i−1)-th row and the j-th column has the voltage Vg1(−) supplied to the first data line 211.

In the meantime, if the data signal Xj becomes the negative voltage Vg1(−) displayed with the gray 1, the inverted data signal /Xj becomes the positive voltage Vg1(+) displayed with the gray 1. For the period $T_0$, since the scanning signal Y(i−1) becomes an H level, in each of the pixels 116 corresponding to the (i−1)-th row, the second TFT 244 is turned on and the first TFT 242 is turned off. For this reason, the pixel electrode 234 of the i-th row and the j-th column becomes the voltage Vg1(+) of the inverted data signal /Xj supplied to the second data line 212.

Since the pixels corresponding to the (i−1)-th row performs only the negative polarity writing operation, the pixels corresponding to the i-th row performs only the positive polarity writing operation. In this case, when the pixel of the i-th row and the j-th column is displayed with gray slightly darker than an intermediate gray-scale level between white and black (for convenience of explanation, referred to as gray 2), in one horizontal scanning period $T_1$ in which the scanning line 311 of the i-th row is selected, the data signal Xj becomes a positive voltage Vg2(+) displayed with the gray 2.

Further, for the period T1, when the scanning signal Yi becomes an H level, in each of the pixels 116 corresponding to the i-th row, the first TFT 242 is turned on and the second TFT 244 is turned off. For this reason, the voltage of the pixel electrode 234 of the i-th row and the j-th column is changed from the voltage Vg1(+) to the voltage Vg2(+).

If the selection of the scanning line 311 of the i-th row is completed and thus the scanning signal Yi becomes an L level, in each of the pixels 116 corresponding to the i-th row, since the first TFT 242 is turned off, the voltage of the pixel electrode 234 of the i-th row and the j-th column is changed from the voltage Vg2(+) to the voltage LCcom due to the leakage voltage.

If one vertical scanning period (1F) elapses and thus the scanning signal Y(i−1) becomes an H level again in the period $T_2$, the writing polarity of the data signal Xj is inverted from the previous writing polarity and then becomes the positive voltage Vg1(+). As a result, the pixel electrode 234 of the (i−1)-th row and the j-th row becomes the voltage Vg1(+). In contrast, if the data signal Xj becomes the positive voltage Vg1(+), since the inverted data signal /Xj becomes the negative voltage Vg1(−), the pixel electrode 234 of the i-th row and the j-th column becomes the voltage Vg1(−) of the inverted data signal /Xj.

Next, if the scanning signal Yi becomes an H level in the period $T_3$, the voltage of the pixel electrode 234 of the i-th row and the j-th column is changed from the voltage Vg1(−) to the voltage Vg2(−). If the scanning signal Yi becomes an L level, the voltage of the pixel electrode 234 of the i-th row and the j-th column is changed from the voltage Vg2(−) to the voltage LCcom due to the leakage voltage.

Hereinafter, the above-mentioned writing operation is repeated for the pixel of the i-th row and the j-th column. In the present embodiment, the pixel of the j-th column has been described, focusing on the j-th column. However, the same writing operation is performed for all of the first to 240-th columns.

Moreover, a hatched region in FIG. 4 represents a potential difference between the pixel electrode 234 and the common electrode 111, that is, a component of the effective voltage value in the pixel capacitor 118.

In addition, according to this writing operation, focusing on the pixel of the i-th row, before the scanning line 311 of the i-th row is selected and a voltage according to a target gray-scale level is written, when the scanning line 311 of the (i−1)-th row before one row is selected, the pixel electrode 234 of the i-th row is previously precharged with a voltage having the same polarity as the voltage according to the target gray-scale level. For this reason, a time required for writing the voltage according to the target gray-scale level can be reduced.

In the present embodiment, the source of the first TFT 242 is connected to the first data line 211 and the source of the second TFT 244 is connected to the second data line 212, so that the drains of the first and second TFTs 242 and 244 are commonly connected to the pixel electrode 234. Further, the data signal supplied to the first data line 211 and the inverted data signal supplied to the second data line 212 have the inversion relationships on the basis of the voltage Vc. As a result, the amount of leaking voltage through the TFT for a holding period is constant without depending on the displayed content (voltage of the data signal). For this reason, in the present embodiment, since the amount of leaking voltage is uniform among the pixels, it is possible to prevent the display quality from being lowered due to the difference between the amounts of leaking voltages.

That is, in the structure according to the related art where one data line is provided, since the deviation occurs in the voltage of the data signal for a holding period depending on the displayed content, the amount of leaking voltage is different for every column, which causes display irregularities in a vertical direction (vertical crosstalk). In the present embodiment, since the amount of leaking voltage is uniform, it is possible to prevent the display quality from being lowered due to the vertical crosstalk.

Further, in the present embodiment, the scanning line 311 intersects each of the first data line 211 and the second data line 212 through the insulator, and thus the scanning line 311 is capacitively coupled with each of both data lines. However, in the present embodiment, the voltage change of the data signal supplied to the first data line 211 and the voltage change of the inverted data signal supplied to the second data line 212 are opposite to each other and have substantially the same size. Accordingly, in the scanning line 311 to be capacitively coupled with each of the first data line and the second data line, an influence by the voltage change of the data signal and an influence by the voltage change of the inverted data signal cancel each other. Therefore, in the present embodiment, waveform distortion of the scanning line 311 by the voltage change of the data signal is prevented.

In the meantime, the common electrode 111 is also capacitively coupled with each of the first data line 211 and the second data line 212, but their influences cancel each other. Accordingly, the potential change of the common electrode 111 is also prevented. For this reason, the display quality can be prevented from being lowered due to the potential change of the common electrode 111.

Further, in the present embodiment, the pixel electrode 234 is capacitively coupled with the first data line 211 through the first auxiliary capacitor 215 while being capacitively coupled with the second data line 212 through the second auxiliary capacitor 216. Accordingly, an influence by the voltage change of the data signal on the pixel electrode 234 cancels an influence by the inverted data signal on the pixel electrode 234.

For this reason, the potential of the pixel electrode 234 is hardly influenced by the voltage change of the data signal, and thus the effective voltage value of the pixel capacitor 118 easily approximates to zero. For example, in a normally black mode, when the effective voltage value applied to the pixel capacitor 118 is particularly close to zero, the transmittance is significantly changed. For this reason, if the effective voltage value of the pixel capacitor 118 can approximate to zero, a brightness range to be displayed is expanded in a dark direction, and thus a contrast ratio can be increased accordingly.

In the embodiment of the invention, the two data lines 211 and 212 need to be provided in each column, but in the IPS mode, as shown in FIG. 2A, the pixel electrode 234 and the first data line 211 or the pixel electrode 234 and the second data line 212 overlap each other, and thus an opening ratio can be prevented from being lowered accordingly.

The potential LCcom is ideally the potential Vc. However, in the TFT 240, since the parasitic capacitance is generated between the gate and the drain of the TFT 240, a phenomenon (referred to as push-down, punch-through, field-through, or the like) is generated that the potential of the drain (pixel electrode 234) is reduced when an on state is changed to an off state. In order to prevent the liquid crystal from being degraded, since the alternating-current drive is principally used in the pixel capacitor 118, the alternating writing is performed with the same gray-scale level at the high level side (positive polarity) and the low level side (negative polarity) for the common electrode 111. However, if the alternating writing is performed in a state in which the potential LCcom is made to be equal to the potential Vc, the effective voltage value of the pixel capacitor 118 at the time of the negative polarity writing operation may be larger than that at the time of the positive polarity writing operation due to the push-down. For this reason, the potential LCcom of the common electrode 111 is set to a potential slightly smaller than the potential Vc serving as the amplitude reference of the data signal such that the effective voltage value of the pixel capacitor 118 is uniform even when the positive polarity writing operation and the negative polarity writing operation are performed at the same gray-scale level.

Although the first TFT 242 and the second TFT 244 are n-channel TFTs in the above-mentioned embodiment, p-channel TFTs can also be used.

Further, in the above-described embodiment, the change cycle of the writing polarity is one frame. This is to prevent the direct-current component from being applied to the pixel capacitor 118. Therefore, as for the inversion, a cycle of two or more frames can be adopted.

In addition, in the above-described embodiment, the gate of the second TFT 244 of the pixel of the i-th row is connected to the scanning line 311 of the (i−1)-th row before one row, but it may be connected to the scanning line 311 of the corresponding row before three rows, five rows, . . . .

Further, the normally black mode in which black is displayed when the voltage is not applied is adopted in the above-mentioned embodiment, but a normally white mode in which white is displayed when the voltage is not applied can be adopted. Moreover, at the time of the normally white mode, the higher the effective voltage value applied to the pixel capacitor 118 is, the darker the pixel is.

Further, the number of gray-scale display levels is not particularly limited. In addition, one dot may be constituted by three pixels of R (red), G (green), and B (blue), so that color display may be performed.

The liquid crystal panel 100 is not limited to a transmissive type, but a reflective type or a transflective type can be used. In addition, the invention is not limited to the IPS mode, but TN liquid crystal, STN liquid crystal, guest host liquid crystal in which a dye (guest) having anisotropy in absorption of visible light in a long axis direction and a short axis direction of molecules is dissolved into liquid crystal (host) of a constant molecular arrangement, and the dye molecules are arranged in parallel with the liquid crystal molecules, or the like can be used. In addition, the vertical alignment (homeotropic alignment) may be provided such that the liquid crystal molecules are vertically arranged with respect to both substrates when the voltage is not applied while the liquid crystal molecules are horizontally arranged with respect to both substrates when the voltage is applied.

Figure 5:
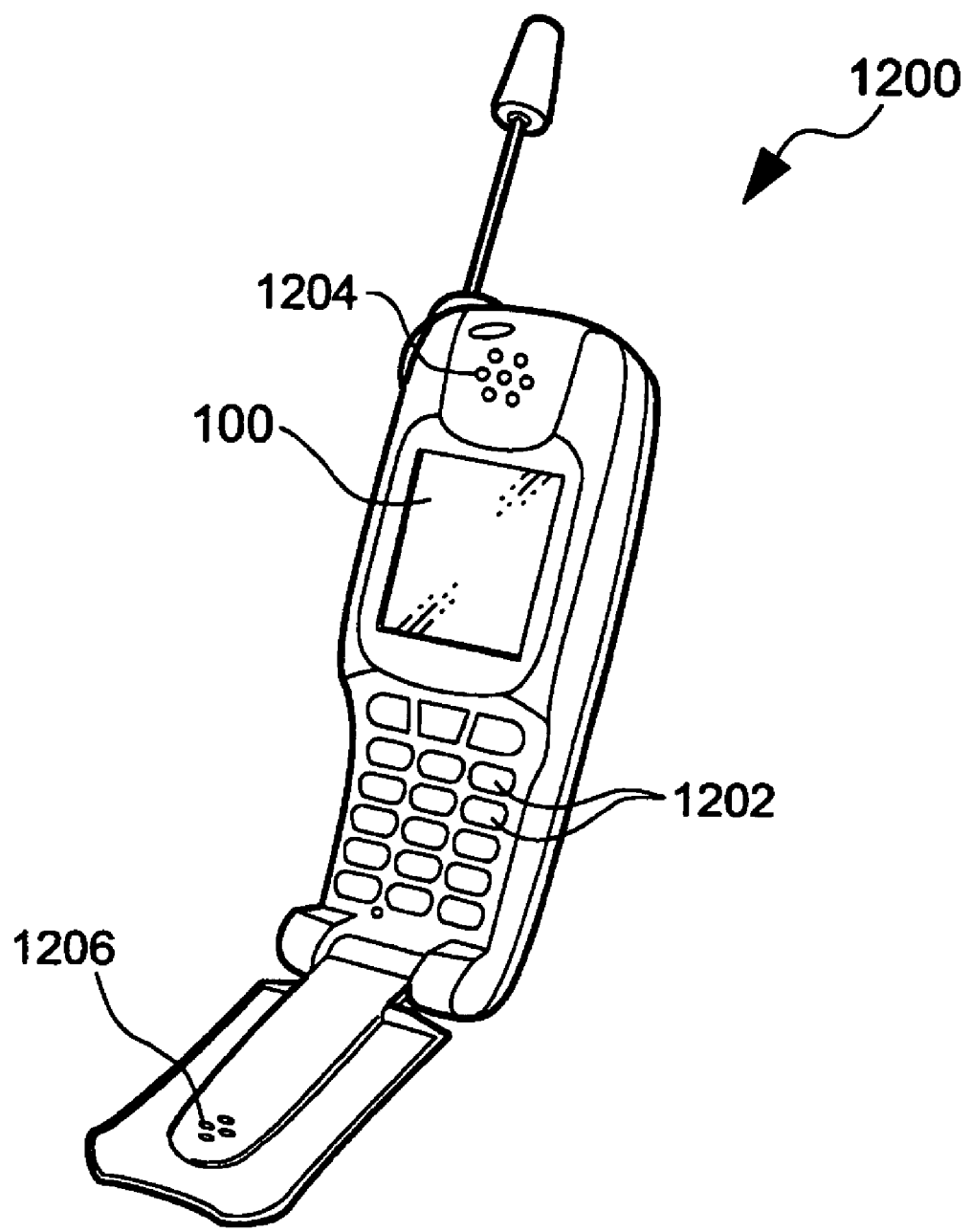
FIG. 5 is a diagram illustrating a structure of a cellular phone using the same electro-optical device.

Next, an electronic apparatus having the electro-optical device 10 according to the above-described embodiment as a display device will be described. FIG. 5 is a perspective view illustrating a structure of a cellular phone 1200 using the electro-optical device 10 according to the embodiment.

As shown in FIG. 5, the cellular phone 1200 has a plurality of operating buttons 1202, a receiver 1204, a transmitter 1206, and the above-described liquid crystal panel 100. Moreover, of the electro-optical device 10, the constituent elements other than the liquid crystal panel 100 are incorporated into the phone, and thus are not viewed.

Moreover, as an electronic apparatus to which the electro-optical device 10 is applied, in addition to the cellular phone shown in FIG. 5, a digital still camera, a notebook computer, a liquid crystal television, a view-finder-type (or monitor-direct-view-type) video recorder, a car navigation device, a pager, an electronic organizer, an electronic calculator, a word processor, a workstation, a video phone, a POS terminal, an apparatus having a touch panel, and the like can be exemplified. Of course, as the display devices of various electronic apparatuses, the above-described electro-optical device 10 can be applied. In addition, in any one of the above-mentioned electronic apparatuses, the display quality can be suppressed from being lowered, and high-quality display can be realized with a simple configuration.

What is claimed is:

1. An electro-optical device comprising:
   pixels that are provided to correspond to intersections of a plurality of rows of scanning lines and a plurality of columns of pairs of first and second data lines;
   a scanning line driving circuit that selects the plurality of rows of scanning lines according to a predetermined sequence; and
   a data line driving circuit that supplies a data signal having a voltage according to a target gray-scale level among a plurality of gray-scale levels of each of pixels corresponding to the selected scanning line to the first data line, and supplies an inverted data signal obtained by inverting the data signal on the basis of a predetermined potential to the second data line, each of the pixels including:
   a pixel electrode;
   a common electrode that faces the pixel electrode;
   a first transistor that is turned on when a corresponding scanning line is selected to supply the data signal from the first data line to the pixel electrode, a gate of the first transistor being connected to the scanning line of an i-th row, and a source of the first transistor being connected to the first data line of a j-th column;
   a second transistor that is turned on when another scanning line different from the corresponding scanning line is selected prior to the corresponding scanning line, and supplies the inverted data signal from the second data line to the pixel electrode, a gate of the second transistor being connected to the scanning line of the (i−1)-th row, a source of the second transistor being connected to the second data line of the j-th column, and a drain of the first transistor and a drain of the second transistor being commonly and directly connected to one end of the pixel electrode of the i-th row, the gate of the first transistor being connected to the scanning line of the i-th row that is connected to a gate of a third transistor, a drain of the third transistor being connected to one end of another pixel electrode of an (i+1)-th row, the first transistor including a first leakage voltage that has an opposite polarity and a substantially same magnitude compared to a second leakage voltage of the second transistor associated with a turned on state of the first and second transistors;
   the scanning line driving circuit causing the scanning line of the (i−1)-th row to be selected, the pixel electrode of the i-th row being previously precharged with a voltage having the same polarity as the voltage according to the target gray-scale level;
   a first auxiliary capacitor that capacitively couples the first data line to the pixel electrode; and
   a second auxiliary capacitor that capacitively couples the second data line to the pixel electrode.

2. The electro-optical device according to claim 1, wherein the pixel electrode and the common electrode are formed on the same substrate.

3. The electro-optical device according to claim 2, wherein the first auxiliary capacitor has a laminated structure of an electrode portion in the first data line, an insulating layer, and the pixel electrode, and the second auxiliary capacitor has a laminated structure of an electrode portion in the second data line, an insulating layer, and the pixel electrode.

4. The electro-optical device according to claim 1, wherein the data line driving circuit divides the voltage of the data signal into a high-level positive voltage and a low-level negative voltage on the basis of the predetermined potential for each predetermined period so as to alternately supply the high-level positive voltage and the low-level negative voltage, wherein the high-level positive voltage and the low-level negative voltage are applied to the pixel electrode to perform grayscale level display.

5. An electronic apparatus comprising the electro-optical device according to claim 1.

6. The electro-optical device according to claim 1, wherein, for each of the pixels, each of the plurality of scanning lines is capacitively coupled with one of the plurality of pairs of first and second data lines.

7. The electro-optical device according to claim 1, wherein the data line driving circuit is configured to reduce vertical crosstalk, thereby providing a high definition display of the electro-optical device.

8. The electro-optical device according to claim 7, wherein the data line driving circuit is configured to reduce vertical crosstalk by combining the first leakage voltage and the second leakage voltage.

9. A method of driving an electro-optical device, which has pixels that are provided to correspond to intersections of a plurality of rows of scanning lines and a plurality of columns of pairs of first and second data lines, each pixel having a pixel electrode provided for each pixel, a common electrode that faces the pixel electrode, a first transistor that is turned on when a corresponding scanning line is selected, and electrically connects the first data line to the pixel electrode, and a second transistor that is turned on when another scanning line different from the corresponding scanning line is selected prior to the corresponding scanning line, and electrically connects the second data line to the pixel electrode, a gate of the first transistor that is connected to the scanning line of an i-th row, and a source of the first transistor that is connected to the first data line of a j-th column, a gate of the second transistor that is connected to the scanning line of the (i−1)-th row, a source of the second transistor that is connected to the second data line of the j-th column, a drain of the first transistor and a drain of the second transistor that are commonly and directly connected to one end of the pixel electrode of the i-th row, the gate of the first transistor being connected to the scanning line of the i-th row that is connected to a gate of a third transistor, a drain of the third transistor being connected to one end of another pixel electrode of an (i+1)-th row, the first transistor including a first leakage voltage that has an opposite polarity and a substantially same magnitude compared to a second leakage voltage of the second transistor associated with a turned on state of the first and second transistors, and a scanning line driving circuit causing the scanning line of the (i−1)-th row to be selected, the pixel electrode of the i-th row being previously precharged with a voltage having the same polarity as the voltage according to the target gray-scale level, and a first auxiliary capacitor that capacitively couples the first data line to the pixel electrode;

and a second auxiliary capacitor that capacitively couples the second data line to the pixel electrode, the method of driving an electro-optical device comprising:

selecting the plurality of rows of scanning lines according to a predetermined sequence; and supplying a data signal having a voltage according to a target gray-scale level among a plurality of gray-scale levels of each of pixels corresponding to the selected scanning line to the first data line while supplying an inverted data signal obtained by inverting the data signal on the basis of a predetermined potential to the second data line.

10. The method of driving an electro-optical device according to claim 9, wherein, for each of the pixels, each of the plurality of scanning lines are capacitively coupled with one of the plurality of pairs of first and second data lines.

* * * * *